United States Patent
Thomas

(10) Patent No.: US 7,508,299 B2
(45) Date of Patent: Mar. 24, 2009

(54) WIRELESS NETWORK TIME STAMP SYSTEM AND METHOD

(75) Inventor: Michael A. Thomas, Grand Blanc, MI (US)

(73) Assignee: Infineon Technologies AG, Munich (DE)

( * ) Notice: Subject to any disclaimer, the term of this patent is extended or adjusted under 35 U.S.C. 154(b) by 700 days.

(21) Appl. No.: 11/084,276

(22) Filed: Mar. 18, 2005

(65) Prior Publication Data

US 2006/0220815 A1    Oct. 5, 2006

(51) Int. Cl.
*B60Q 1/00*   (2006.01)
*G08B 1/08*   (2006.01)
*H04Q 7/00*   (2006.01)

(52) U.S. Cl. ............ 340/438; 340/447; 340/539.1; 340/10.2; 340/505; 340/3.2; 73/146.5

(58) Field of Classification Search .......... 340/438, 340/3.2, 505, 10.51
See application file for complete search history.

(56) References Cited

U.S. PATENT DOCUMENTS

| | | | |
|---|---|---|---|
| 6,043,738 A | 3/2000 | Stewart et al. | |
| 6,087,930 A | 7/2000 | Kulka et al. | |
| 6,446,151 B1 * | 9/2002 | Fischer et al. | 710/124 |
| 6,486,773 B1 | 11/2002 | Bailie et al. | |
| 6,507,276 B1 | 1/2003 | Young et al. | |
| 6,630,885 B2 | 10/2003 | Hardman et al. | |
| 6,838,985 B2 | 1/2005 | Ghabra et al. | |
| 6,840,099 B2 | 1/2005 | Luce | |
| 6,901,066 B1 * | 5/2005 | Helgeson | 370/348 |
| 7,095,316 B2 | 8/2006 | Kachouh et al. | |
| 2005/0003781 A1 | 1/2005 | Kunz et al. | |
| 2005/0011257 A1 | 1/2005 | Modawell et al. | |
| 2005/0024192 A1 | 2/2005 | Desai | |
| 2005/0028595 A1 | 2/2005 | Pfeifer et al. | |

* cited by examiner

*Primary Examiner*—Donnie L Crosland
(74) *Attorney, Agent, or Firm*—Eschweiler & Associates, LLC

(57) ABSTRACT

A wireless time stamp system and associated method is disclosed and includes a plurality of slave wireless sensor components each configured to transmit a sensed system condition at unique predetermined time intervals. The system further includes a master wireless control component configured to receive the transmitted sensed system conditions from each of the slave wireless sensor components. The master wireless control component is further configured to assign the unique predetermined time intervals to each of the slave wireless sensor components, thereby eliminating data collisions at the master wireless control component.

27 Claims, 8 Drawing Sheets

WIRELESS NETWORK TIME STAMP SYSTEM AND METHOD

FIELD OF INVENTION

The present invention relates generally to communications systems and more particularly to systems and methods for facilitating efficient and reliable communications between a plurality of tire sensors and a central vehicle control module.

BACKGROUND OF THE INVENTION

It is known in the automotive industry to provide for wireless monitoring of vehicle tire parameters, particularly tire pressure. In such tire pressure monitoring systems, tire pressure sensors and radio frequency (RF) transmitters are mounted inside each tire, typically adjacent the inflation valve stem. In one prior art system implementation, the tire pressure sensed by the tire pressure sensor is transmitted by the transmitter to a central receiver/controller located on-board the vehicle. The tire pressure information delivered to the receiver/controller by the RF signals from the transmitters is subsequently conveyed to a vehicle operator or occupant, typically in the form of a display.

To recognize the particular tire location associated with an RF signal received from a tire transmitter (e.g., front left (FL), front right (FR), rear left (RL), rear right (RR)), such tire pressure monitoring systems are programmed in an initialization or sign-up operation. That is, in order to provide a vehicle operator with information specific to each vehicle tire, programming of the tire pressure monitoring system is undertaken, typically by a technician, so that each RF signal from a tire transmitter will be associated with a particular tire location. In the above manner, if a "low tire pressure" indicator is provided to an occupant of the vehicle, the indication will also include an indication of which tire has such condition.

In one prior art example, the tire pressure monitoring system uses a magnetic reed switch in each tire for such programming. More particularly, after the on-board vehicle/controller is placed into a program, initialization, or "learn" mode, the magnetic reed switch in each tire is activated by a technician using a magnet. Such activation causes the tire transmitter in the tire to transmit a tire pressure signal to the controller on the vehicle. In that regard, each pressure sensor and/or transmitter has a unique identification code associated therewith, which identification code is transmitted with the tire pressure signal. Using such identification codes the controller associates each received tire pressure signal with a particular tire location.

Such operation, however, can create problems when tires are subsequently rotated or changed from their initial locations to new locations, or a vehicle tire is replaced (e.g., a tire replacement or use of the spare tire). Each time the vehicle tires are rotated or a tire is replaced, the manual initialization procedure must be repeated to ensure that the system continues to operate properly by conveying accurate information, including tire location, to the vehicle operator. This initialization requirement makes tire rotation (or other tire changes) more complex, and increases the possibility of inaccurate operation of the system.

The tire transmitters used in such tire pressure monitoring systems are typically battery powered. As a result, a tire transmitter has a limited amount of functioning time before its battery must be replaced. To help conserve battery power, the transmitters typically transmit tire pressure information at short, predetermined time intervals (as opposed to continuously) when the vehicle is moving. In addition, once the vehicle has been stationary for a predetermined amount of time, the transmitters may transmit tire pressure information at longer predetermined time intervals.

Conventional tire monitor modules employ an accelerometer to increase the periodic rate at which transmissions are made to vehicle controller/receiver. Consequently, when the vehicle is at rest, a rate at which tire data is transmitter may be at a first, relatively long time interval, such as 30 minutes. Alternatively, as the accelerometer senses the vehicle increasing in speed above a threshold value, the tire transmitter may transmit tire data at a second, relatively short time interval, such as about 1 minute. Typically, the accelerometer is a mechanical or micro-electromechanical (MEM) device that can be prone to fail. Further, some accelerometers have difficulty meeting the stringent system tolerances. Lastly, the accelerometer adds to the complete solution cost.

In any event, each prior art tire transmitter operates independently of the other transmitters. Consequently, when two or more tire transmitters associated with a vehicle transmit tire pressure signals or data simultaneously, a data collision can result at the vehicle central receiver/controller, which can adversely affect proper operation of the tire pressure monitoring system. One prior art solution to the above collision problem involves implementation of anti-collision algorithms, wherein each tire transmitter transmits the tire data in a redundant manner that is spaced apart from each other in time (e.g., eight transmissions). In addition, each tire transmitter spaces apart the redundant data with a different time interval. Consequently, when data is sent, although data collisions are not necessarily avoided, the redundant data transmissions ensure that at least some of the data finally gets through to the vehicle receiver/controller. This prior art solution is effective, however, since more time is employed to transmit the data, more battery current is employed, thereby resulting in a shorter battery life of the tire sensor module. In addition, the redundant transmissions increase the average radiated emissions that are measured by governmental regulators in selected regions, and thus in some instances are undesirable. Lastly, since the vehicle controller/receiver is required to stay active for a longer period of time, more current is required of the vehicle batter, which in some instances may be undesirable.

Another prior art solution employed to communicate tire pressure data from each sensor to the vehicle controller/receiver employs low frequency (LF) initiators that are local to each tire pressure sensing module at each respective tire. Each LF initiator module includes an antenna that transmits a low frequency initiation signal to the tire monitor module, thereby "awakening" the module for transmission of tire data therefrom. Because the low frequency signal (e.g., about 125 KHz) power decays extremely quickly, only the tire module local to the respective LF antenna is activated. By having each LF initiator module operating at distinct, different timing intervals, data collisions are avoided.

The prior art LF initiator solution, however, may require additional certification from various regulator commissions due to the LF transmissions, and requires LF antennas to be located at each wheel location. Further, the LF initiator requires some form of module and wiring to each antenna location. In addition, to generate and transmit the LF initiation signal, a high current and/or high voltage driver is required to generate sufficient field strength for the LF receiver at the tire sensor. Lastly, each tire sensor module requires continuous current from its local battery to activate the LF receiver in the module.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later. The present invention is directed to a system and method of collecting and transmitting tire data in a tire monitoring system associated with a vehicle.

In accordance with one embodiment of the invention, a tire monitoring system is disclosed. The tire monitoring system comprises one or more tire sensor modules that is configured to acquire and transmit tire data associated therewith. The tire monitoring system also comprises a vehicle control module operably associated with the one or more tire sensor modules. The vehicle control module is configured to receive the transmitted tire data from the one or more tire sensor modules, and is further configured to dictate a predetermined time interval at which the tire data is to be transmitted thereto. More particularly, the vehicle control module is operable to dictate predetermined time intervals for multiple tire sensor modules (when employed) such that the predetermined time intervals are unique and do not overlap one another in the time domain. In the above manner, tire data collisions at the vehicle control module are eliminated.

In accordance with another embodiment of the present invention, a tire sensor module that is operably associated with a vehicle tire comprises a battery, a tire parameter sensor (e.g., a tire pressure sensor), a tire sensor controller, and a transceiver. The tire sensor module is configured to operate in a low power mode when not transmitting power data, wherein a current draw on the battery in such low power mode is maintained at a relatively low level. For example, in one implementation during the low power mode, only a clock circuit operably associated with the tire sensor controller draws battery current, while other components are switched off to conserve power.

The clock circuit keeps track of a predetermined time interval assigned thereto from the vehicle control monitor, and when the predetermined time interval commences, the tire sensor module components are activated, wherein tire data is acquired and transmitted, for example, in a wireless fashion, to the vehicle control module via the transceiver. Because each tire sensor module has its own unique predetermined time interval that does not overlap that of other tire sensor modules, the tire data is transmitted advantageously to the vehicle control module without data collisions thereat.

In accordance with another embodiment of the present invention, the vehicle control module is configured to alter the predetermined time interval associated with one or more tire sensor modules based on one or more vehicle characteristics. In one example, based on a detected vehicle speed, the predetermined time interval is altered so as to increase a frequency of data acquisition, wherein the updated predetermined time interval still is maintained so as not to overlap other time intervals of the other tire sensor modules, if any. After receipt of tire data from a given tire sensor module, the vehicle control module transmits the updated predetermined time interval so that the tire sensor module will transmit the next portion of tire data in accordance therewith.

In accordance with yet another embodiment of the present invention, a system for identifying a location of the various tire sensor modules associated with the vehicle is provided. The vehicle control module is physically located in the vehicle nearer to one of the tire sensor modules than the others. For example, the vehicle control module may be located closest to the module associated with the right front tire. By transmitting a signal from each of the tire sensor modules to the vehicle control module, the vehicle control module is configured to identify a location of at least two of the tire sensor modules by evaluating a signal strength of the transmissions received thereat.

Since the wireless transmission field strength decays relatively quickly, it may be difficult to ascertain the locations of all the tire sensor modules based solely on field strength with a sufficiently high degree of certainty. In such instances, the locations of the remaining tire sensor modules may be determined by having the tire sensor modules transmit a periodic frequency shift keyed (FSK) modulated signal while the vehicle is moving in a turn pattern. The control module is further configured to evaluate the amplitude change in the frequency of the FSK modulation to identify the location of the remaining tires. Upon identification thereof, upon receipt of tire data that is outside of recommended specifications, the vehicle control module is configured to communicate the condition to a user for maintenance thereof, for example.

In another embodiment of the invention, a method for transmitting tire data from a plurality of tire sensors to a vehicle control module is provided. The method comprises assigning a predetermined time interval, which is employed for transmission of tire data, to each of the tire sensor modules, wherein each of the time intervals are unique and do not overlap one another in the time domain. Upon the assignment of the predetermined time intervals, each tire sensor module acquires and transmits tire data to the vehicle control module in accordance with its respective time interval. Accordingly, the vehicle control module receives the tire data from each of the tire sensor modules without data collisions.

In accordance with another embodiment of the present invention, each of the tires sensor modules operate in a low power mode, wherein most of the components associated therewith are switched off. In the low power mode, a clock circuit associated with a tire sensor module controller is activated and keeps track of the predetermined time interval. At the assigned time, the respective tire sensor module is activated, or "wakes up", and tire data is acquired and transmitted to the vehicle control module. Upon transmission of the tire data, the respective tire sensor module components (not including the clock circuit) are switched off, thereby conserving the battery power of the respective module.

In yet another embodiment, the vehicle control module, upon receipt of the tire data, is configured to selectively transmit updated predetermined time interval information back to the respective tire sensor module based on, for example, one or more vehicle characteristics. For example, in one embodiment, when an increase in vehicle speed is detected, the vehicle control module alters the next predetermined time interval so that the frequency at which tire data is acquired and transmitted is increased. In such instance, the updated predetermined time intervals are still preferably unique and do not overlap one another in the time domain, thereby eliminating tire data collisions at the vehicle control module.

In yet another embodiment of the invention a general network system and method is provided in which a plurality of wireless sensor components are operable to sense one or more similar or different system or environmental conditions and transmit such data to a wireless control component, wherein each of the sensor components send such data at unique predetermined time intervals. Further, the wireless control component is configured to receive such data, and is further configured to assign the unique predetermined time intervals to the wireless sensor components.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
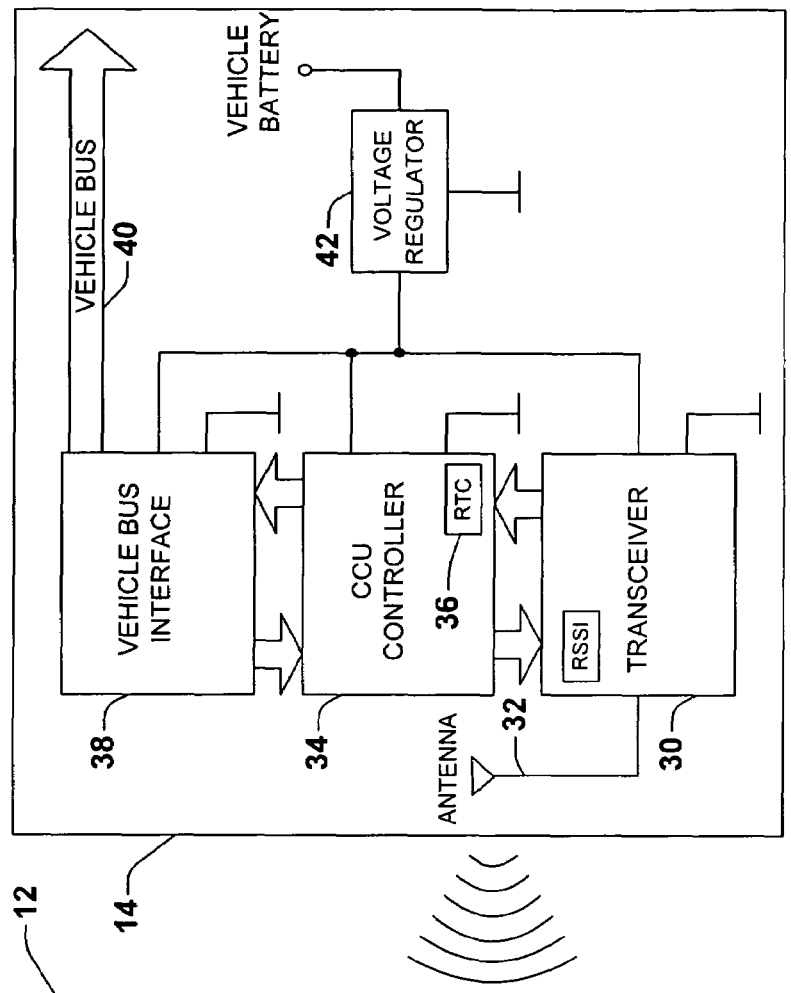
FIG. 1 is a system level block diagram illustrating a system for acquiring and transmitting tire data in a vehicle according to one exemplary embodiment of the present invention.
Figure 1:
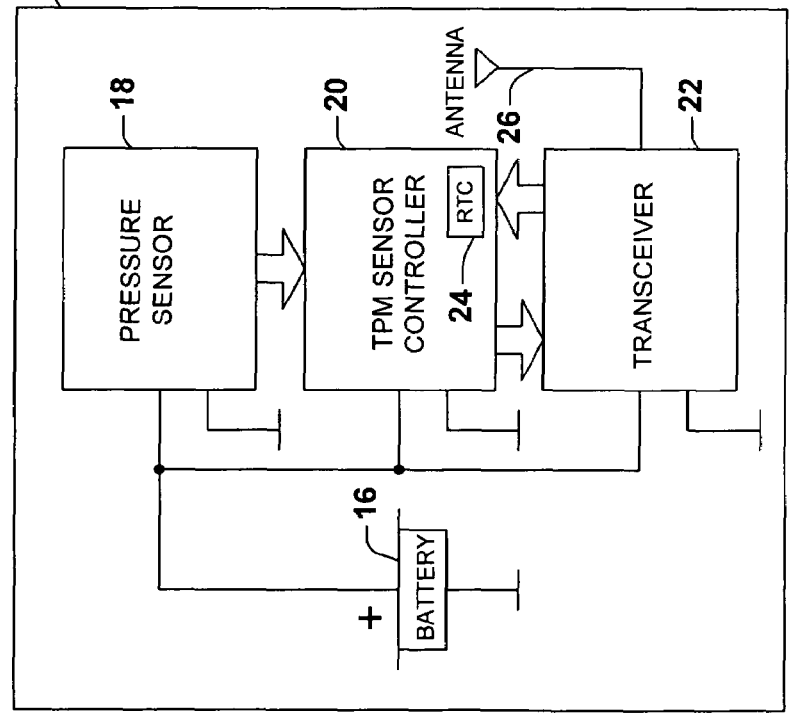

One or more implementations of the present invention will now be described with reference to the attached drawings, wherein like reference numerals are used to refer to like elements throughout. The invention relates to a tire monitoring system and associated method wherein tire data is acquired and transmitted from one or more tire sensor modules to a vehicle control module in a reliable and efficient manner.

Turning to FIG. 1, a block diagram illustrates a tire monitoring system 10, wherein one of one or more tire sensor modules 12 is operably associated with a vehicle control module 14. In one example, each tire of a vehicle (not shown) has a tire sensor module 12 associated therewith, wherein the tire sensor module is configured to acquire one or more tire parameters (e.g., a tire pressure), and transmit the tire data to the vehicle control module 14. In the exemplary embodiment of FIG. 1, each tire sensor module 12 comprises a battery 16 that is operable to provide power to various tire sensor module components. The module 12 further comprises a parameter sensor 18 such as a pressure sensor that is powered by the battery 16 and configured to measure a tire parameter (in this case, the tire pressure), and provide such tire data to a tire sensor module controller 20.

The tire sensor module controller 20 is also operably coupled to the battery 16, and is configured to transfer the acquired tire data to a module transceiver 22 based on a predetermined timing as provided or ascertained by a clock circuit 24 (or real-time clock (RTC)). In the above example, the clock circuit 24 is a part of the tire sensor module controller 20, however, it should be understood that in alternative embodiments the clock circuit 24 may be a stand-alone component or associated with another component in accordance with the invention. As will be further discussed in greater detail below, the clock circuit 24 operates to dictate a timing in which acquired tire data is transmitted from the transceiver 22 via an antenna 26 to the vehicle control module 14. In one embodiment of the present invention, the transceiver 22 and antenna 26 cooperatively operate to transmit tire data wireless at a UHF frequency, for example, about 315 MHz.

Each tire sensor module employed in the tire monitoring system 10 is operable to enter a low power mode, wherein the power of the battery 16 is minimized and thus conserved. In one example, in the low power mode, all the components except for the clock circuit 24 are switched off. The clock circuit 24, upon reaching a predetermined time interval (as will be discussed and more fully appreciated infra), activates the other components, wherein, for example, the pressure sensor 18 acquires tire pressure data and transfers such data to the transceiver 22 via the tire sensor controller 20. In one example, the tire parameter sensor 18 only acquires tire data during the respective predetermined time interval, however, in alternative embodiments, the sensor may periodically activate, acquire data and save such data locally. Subsequently, during the predetermined time interval, multiple segments of tire data may be transmitted.

In one exemplary embodiment of the present invention, the transceiver 22 contains a modulator/demodulator (not shown) that is configured to receive the tire data and modulate such data for UHF transmission. In one embodiment of the invention, the tire data is frequency modulated and up-converted for transmission to the vehicle control module.

The vehicle control module (which may also be called a central control module (CCU)) 14 comprises a transceiver 30 that is configured to receive transmitted tire data from the various tire sensor modules via an antenna 32. The transceiver 30 contains a modulator/demodulator that, upon receipt of tire data, demodulates the data and provides such demodulated data to the vehicle control module controller 34. The controller 34, in one embodiment, comprises a master clock 36 (which may be called a real-time clock (RTC)), that is employed by the controller for synchronizing the clock circuits of the various tire sensor modules thereto. Since such clocks 24 and 36 are synchronized, both the vehicle control module and the various tire sensor modules operate synchronously with respect to the transmission and receipt of the tire data, as well as other information.

The vehicle module controller 34 is operably coupled to a vehicle bus interface 38 that is operably associated with a central vehicle controller (not shown) via a vehicle bus 40. For example, if the vehicle module controller 34 receives tire data from one or more tire sensor modules 12 that is outside a proscribed range, the controller may send an alarm or status message over the vehicle bus 40 for communication of the status condition to a user, for example. Each of the vehicle control module components is coupled to the vehicle battery via a voltage regulator 42 in order to prevent voltage or current swings due to changed loading, etc.

In accordance with one embodiment of the present invention, the vehicle module controller 34 is configured to assign unique predetermined time intervals to each of the tire sensor modules 12, wherein each of the predetermined time intervals are at different times and do not overlap one another in the time domain. Such time intervals are then employed by each tire sensor module 12 to awaken from a low power mode, acquire tire data, and transmit such tire data back to the vehicle control module. By having each predetermined time interval unique, tire data collisions will not occur at the vehicle control module. Consequently, the present invention eliminates the inefficient conventional anti-collision algorithms, wherein various modules send multiple blocks of redundant data, etc. In addition, since each block of data need only be sent once during a predetermined time interval, reduced electromagnetic transmissions occur, which may be advantageous in complying with various emission regulations in certain regulatory jurisdictions. Further, since each tire sensor module 12 has a predetermined time allocated thereto, the various components associated therewith can be switched off (except for the clock circuit 24), so that minimal current is drawn from the battery, thereby substantially improving the life of the various tire sensor modules.

Figure 2:
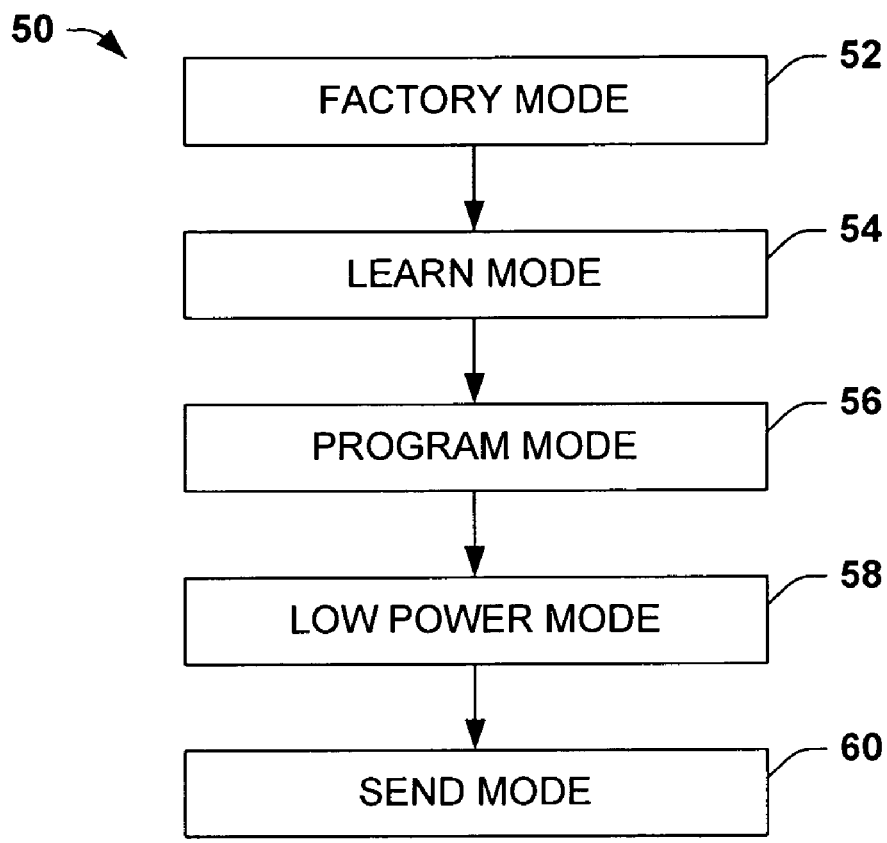
FIG. 2 is a flow chart diagram illustrating a plurality of differing available modes of operation of the system of FIG. 1 according to another embodiment of the invention.

FIG. 2 is a flow chart diagram 50 that illustrates various modes in which the tire monitoring system 10 of FIG. 1 may reside according to one exemplary embodiment of the invention. For example, initially the tire monitoring system may reside within a factory mode 52, wherein each of the tire sensor modules 12 associated with the vehicle are in a low current mode of operation. In the factory mode, the low current mode of operation is maintained until a general wake-up command is transmitted by the vehicle control module 14 to all the tire sensor modules 12. The general wake-up command is issued by the vehicle module controller 34 and transmitted via the transceiver 30 and antenna 32. Upon receiving the general wake-up command, each tire sensor module 12 enters the learn mode 54, wherein the tire module controllers 20 of each module provide instructions for a periodic transmission be sent from each respective transceiver 22 via the antenna 26. In one example, each tire sensor module transmits a unique identification signal that identifies the respective module, and such identification signal is amplitude modulated and transmitted on a periodic basis during the learn mode. Each tire sensor module 12 will continue transmitting the signal until the vehicle control module will communicate back that the module has been identified. As will be discussed below in greater detail, the vehicle control module performs an analysis based on the received signals from the various tire sensor modules to identify both the identity and location of each of the modules.

Upon each tire sensor module being identified, the tire monitoring system 10 exits the learn mode 54 and enters a program mode of operation 56, as illustrated in FIG. 2. In a first portion of the program mode 56 the clock circuit 24 in each of the tire sensor modules 12 is synchronized to the master clock circuit 36 in the vehicle control module 14. Upon synchronization, the vehicle control module 14 will then transmit time/date information that will let each tire sensor module 12 know how long it must remain in a low power mode of operation prior to waking up for transmission of new tire data to the vehicle control module. In the above manner, each tire sensor module receives a unique predetermined time interval associated with the time/date information, wherein the predetermined time intervals are different from one another and do not overlap one another in the time domain.

Each of the tire sensor modules 12 then enter the low power mode 58, wherein, in one example, all of the components except for the clock circuit 24 are switched off in order to reduce current draw on the tire sensor module battery 16. Then, based on the arrival of the predetermined time interval, each of the tire sensor modules will selectively enter the send mode 60. That is, if the first tire sensor module received time/date data for a first time period, when that first time period arrives, it awakens into the send mode while the other tire sensor modules remain in the low power mode 58. In the send mode 60, the selected tire sensor module activates or turns on its various components, acquires tire data via the tire parameter sensor 18 (e.g., a tire pressure), and transmits such data to the vehicle control module 14 via the transceiver. In one example, the acquired tire data is frequency modulated and up-converted in the transceiver 22 and transmitted via the antenna 26. Upon transmission being completed, the selected tire sensor module 12 returns to the low power mode 58 and awaits its next predetermined time interval.

In accordance with another embodiment of the invention, during the send mode 60, after the tire data has been received at the vehicle control module 14, the vehicle control module transmits back an updated time/date information that dictates the next predetermined time interval. In one example, the next predetermined time interval is the same type of interval as used previously, wherein a frequency at which the data is collected from the tire sensor modules 12 remains relatively constant. In another example, the predetermined time interval changes, for example, based on one or more characteristics associated with the vehicle in which the tire monitoring system 10 resides. For example, the vehicle control module 14 may receive updated vehicle speed information via the vehicle bus 40, wherein at low speeds (or in a parked condition), the frequency at which tire data is acquired and transmitted may be reduced substantially (e.g., about once per hour), while at vehicle speeds above a given threshold the tire data may be acquired and transmitted at a substantially higher frequency (e.g., about once per minute). By sending the new time/date information based on one or more vehicle characteristics, the vehicle control module dynamically varies the next predetermined time intervals to collect the needed data while concurrently reducing the power drawn from the various tire sensor modules 12 when such high frequency tire data collection is not needed.

In yet another alternative embodiment of the present invention, when the system is acquiring tire data infrequently (e.g., once per hour), the system may account for potential changes during the low power mode time frame by periodically awakening and checking if the vehicle condition (e.g., speed) has changed. If not, the tire sensor modules do not see a general awaken command from the vehicle control module, and they then return to their low power mode. The periodic wake-up and check for a change in vehicle conditions may be performed at any predetermined time interval (e.g., every five (5) minutes).

Figure 3:
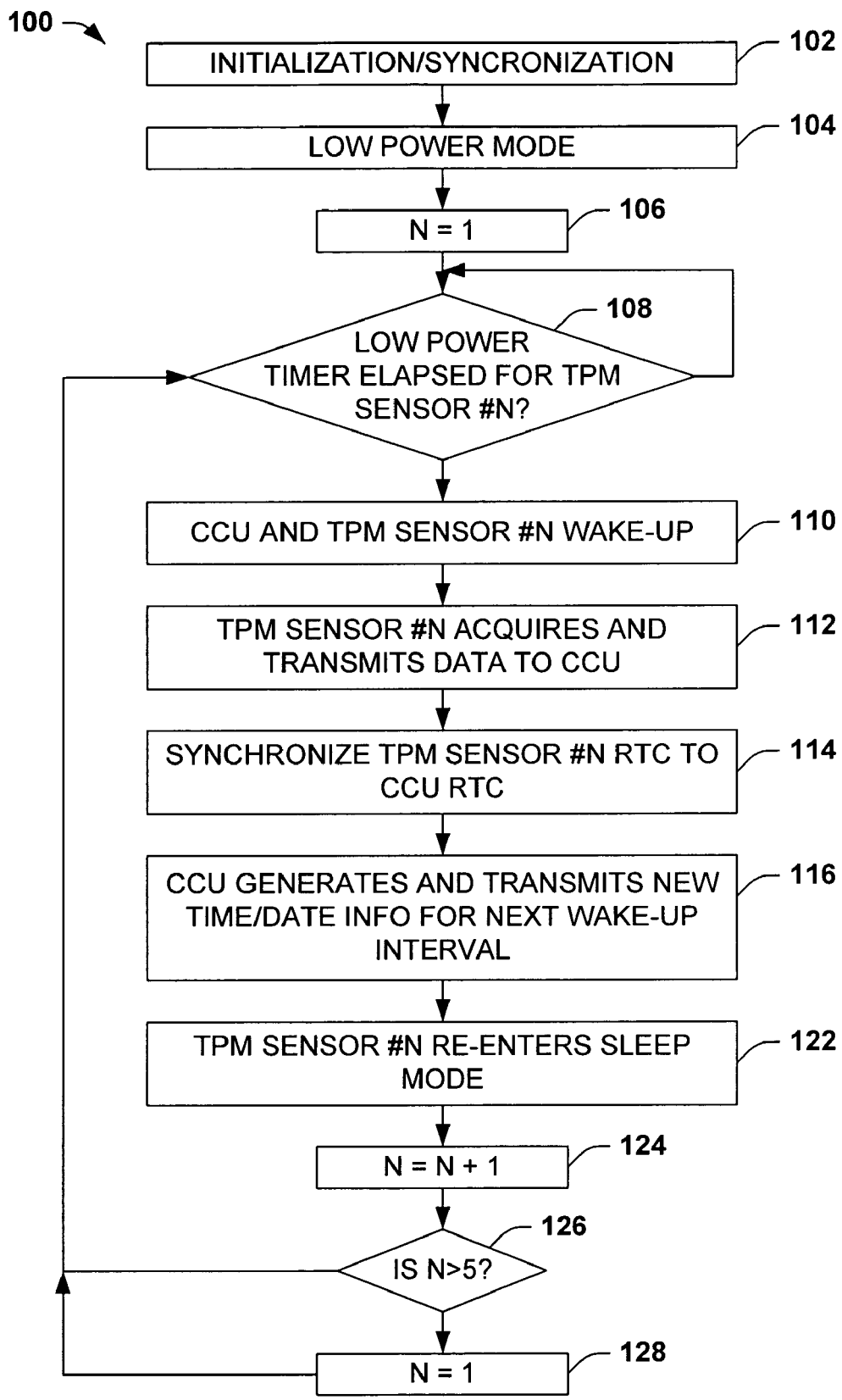
FIG. 3 is a flow chart diagram illustrating a method of acquiring and transmitting tire data from a plurality of tire sensor modules to a vehicle control module within a vehicle in accordance with an exemplary embodiment of the invention.

Turning now to FIG. 3, a method 100 of obtaining a transmitting tire data in a tire monitoring system (such as the system 10 of FIG. 1, for example) is provided. Although the method 100 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods of the present invention may be implemented in association with various types of tire monitoring components and systems, and any such system or group of components, either hardware and/or software, incorporating such a method is contemplated as falling within the scope of the present invention.

The method 100, in one example, starts at 102, wherein an initialization and/or synchronization procedure takes place. As will be described in greater detail infra, the initialization 102 may include the identification of the identity and/or location of each of the tire sensor modules associated with the vehicle, wherein in the present example, each of the tire sensor modules are identified as PTM sensor #N. Further, in the initialization process, each of the tire sensor modules is provided time/date information that dictates a predetermined time interval associated therewith, wherein each of the time intervals for the various modules are unique and do not overlap one another in time. In the present example, a tire sensor module is associated with each tire of the vehicle, including the spare tire, and therefore in a typical vehicle there may be five (5) such tire sensor modules. It should be understood, however, that the present invention is also applicable to tire monitoring systems that employ fewer or a larger number of tire sensor modules, and such alternatives are contemplated as falling within the scope of the present invention.

Each of the tire sensor modules reside in a low power mode at 104. In one example of the invention, the low power mode comprises a system condition where each of the components of the tire sensor module are switched off, except for a clock circuit associated therewith. In such an instance, the current draw from the tire sensor module battery is reduced to a minimal level, which advantageously improves the battery life of the module. The method 100 proceeds to 106, wherein the vehicle control module initializes a count associated with the identity of the various tire sensor modules. In the present example, the count initialization is a one (1).

At 108, the relevant tire sensor modules make an evaluation whether the clock circuit associated therewith (e.g., a timer) has identified the predetermined time interval. Since N=1, the clock circuit of tire sensor module #1 makes the determination at 108, and if the determination is negative (NO at 108), the clock circuit continues the evaluation. If, however, the determination is in the affirmative (YES at 108), the vehicle control module (CCU) and the tire sensor module (module #1) wake-up at 110. The tire sensor module #1 then acquires the tire data and transmits the data to the vehicle control module at 112 during the predetermined time interval assigned thereto. The vehicle control module, upon receipt of the tire data, re-synchronizes the clock circuit of the tire sensor module #1 with the master clock at 114.

Figure 4:
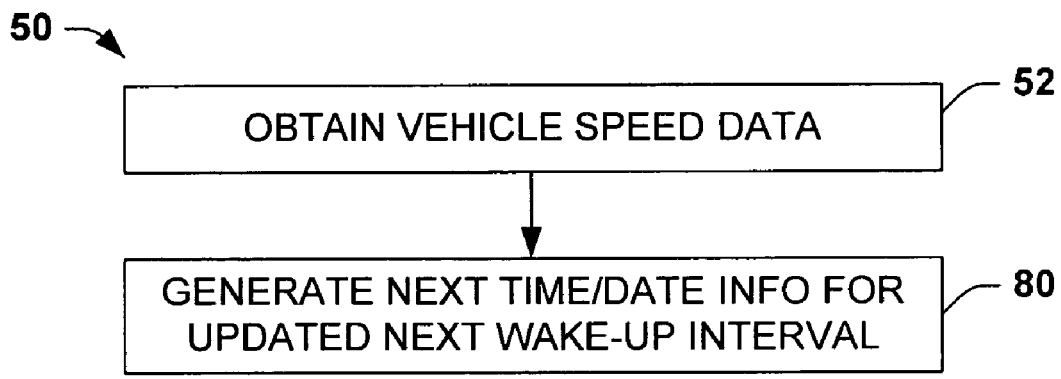
FIG. 4 is a flow chart diagram illustrating an additional act of updating predetermined time intervals according to another optional embodiment of the invention.

Further, the vehicle control module generates and transmits new time/date information (an updated predetermined time interval) for the next time the sensor module #1 is to awaken and acquire/transmit data at 116. The vehicle control module may simply maintain the frequency at which such data is acquired/transmitted, or alternatively, may alter the frequency thereof based on one or more vehicle characteristics. For example, as illustrated in FIG. 4, the vehicle control module may obtain vehicle information via the vehicle bus, such as the vehicle speed at 118, and generate a new time/date information in response thereto. For example, at higher speeds, it may be desirable to obtain tire data more frequently, and thus the new time/date information may request that the next time the tire sensor module #1 should re-awaken and provide such data will be sooner than previously.

After the tire sensor module #1 receives the updated time/date information at 116, the tire sensor module goes back to sleep (e.g., into a low power mode of operation) at 122, and the tire sensor module counter at, for example, the vehicle control module increments at 124. At 126, a check is made to ensure that the count variable N has not exceeded a predetermined threshold (e.g., N=5 for a standard vehicle). If the variable has not exceeded the threshold (NO at 126, the method 100 continues at 108 and the next module determines when its predetermined time interval has arrived, etc. If the threshold has been exceeded (YES at 126), the variable N is set back to one (1) at 128, and the method continues back at 108.

The method 100 then proceeds through acts 108 through 128 as described above until all the tire sensor modules have transmitted their tire data to the vehicle control module, and then the method continues by going back to the first tire sensor module and repeating the process. In the above manner, tire data is transmitted in a wireless fashion from each tire sensor module to the vehicle control module. Further, by providing each tire sensor module with its own predetermined time interval in which the tire data is to be transmitted, tire data collisions at the vehicle control module are eliminated. Lastly, since each tire sensor module is preferably in a low power mode at all times except for during its predetermined time interval, the amount of power drawn from the tire sensor module battery is substantially reduced over conventional solutions.

Figure 5:
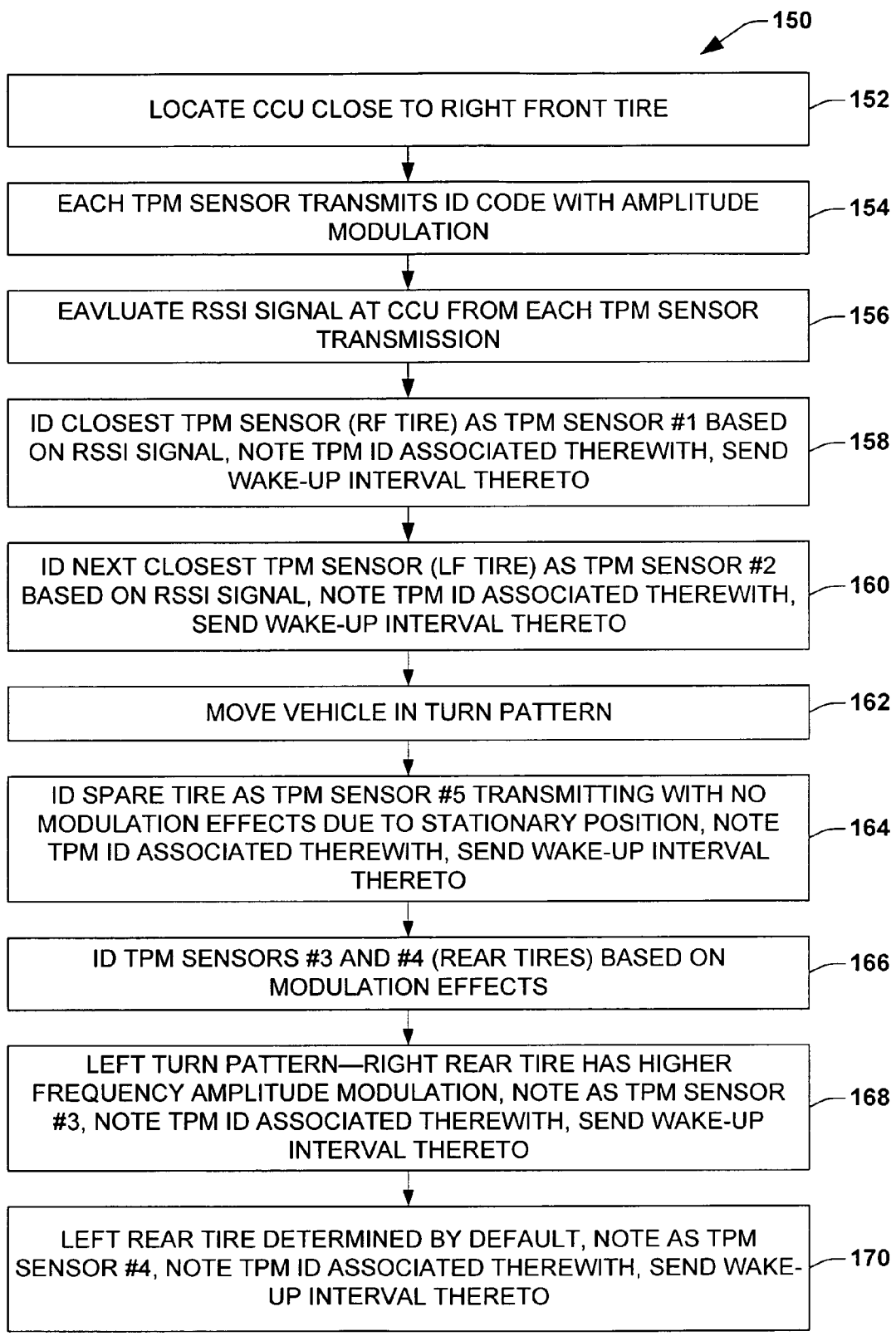
FIG. 5 is a flow chart diagram illustrating a method of locating each of the tire sensor modules in the vehicle according to another embodiment of the present invention.

As alluded to above, the tire monitoring system 10 and the method 100 of the present invention each contemplate an identification of a location of each tire sensor module in the vehicle. FIG. 5 is a flow chart diagram illustrating a method 150 of identifying the tire sensor module location in accordance with one exemplary embodiment of the present invention. FIG. 5 will be described in conjunction with FIGS. 6-9 in order to facilitate an understanding of this exemplary embodiment.

Figure 6:
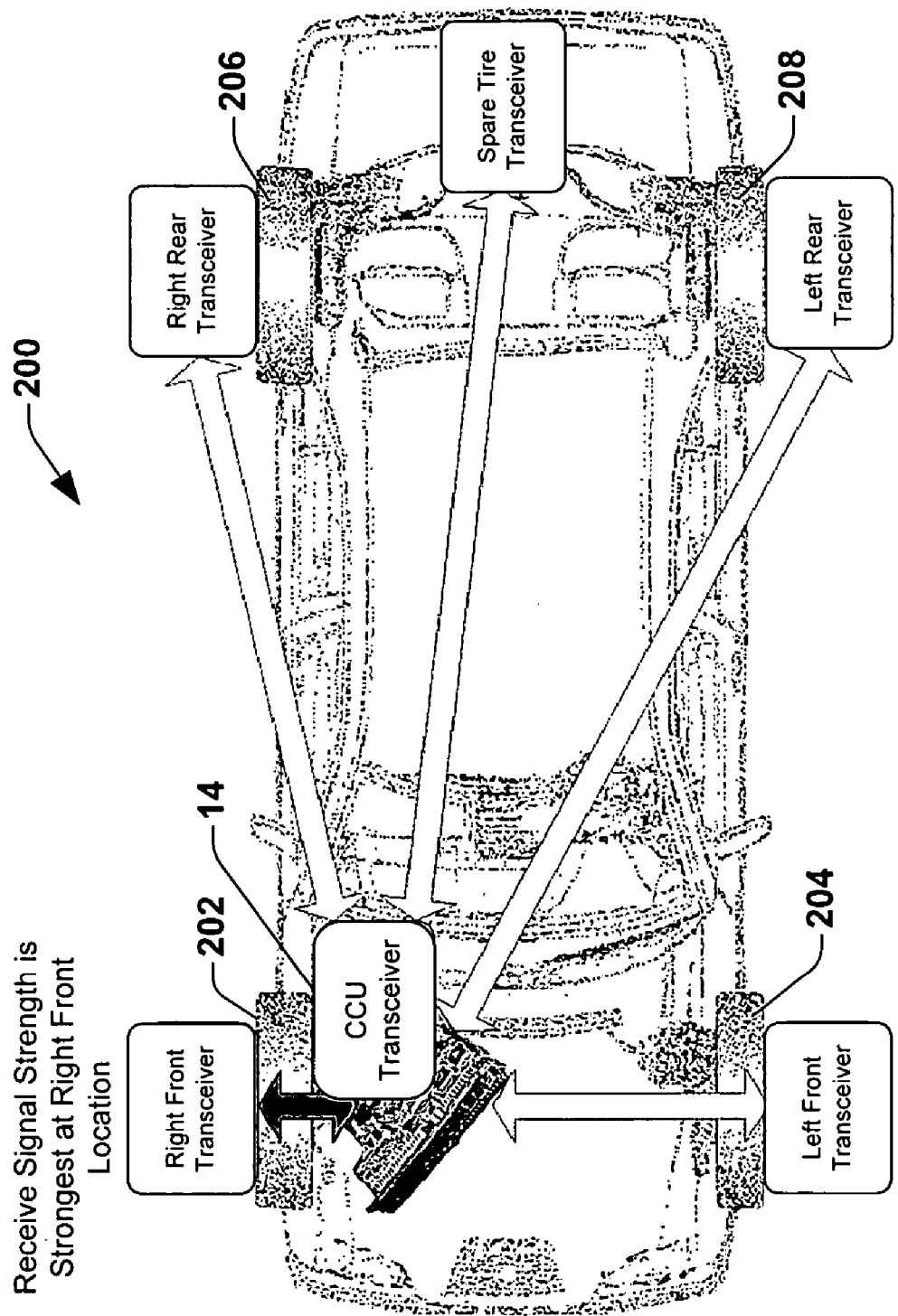
FIG. 6 is a plan view of a vehicle having five tire sensor modules and a vehicle control module associated therewith, wherein one of the tire sensor module locations is identified using the received signal transmission strength according to an exemplary embodiment of the invention.

The method 150 begins at 152, wherein the vehicle control module 14 is located physically closer to one of the tire sensor modules than the others. For example, the vehicle control module may be located close to the right front tire where one of the tire sensor modules is located. The method 150 then continues at 154, wherein each of the tire sensor modules 12 transmit a signal to the vehicle control module. In one example, each tire sensor module transmits a periodic unique identification code that is FSK modulated, however, other signals may be employed and are contemplated as falling within the scope of the present invention. The vehicle control module 14 receives the various signals from the tire sensor modules, and the transceiver 30 includes a receiver signal strength indicator (RSSI) circuit 31 that generates a signal that is a function of the radiated power from each tire sensor module, and the RSSI signal is evaluated at 156. Therefore the received signals from the tire sensor modules will each produce a different RSSI signal based on a distance they are away from the vehicle control module. Since the vehicle control module 14 is located physically closer to one of the tire sensor modules than the others, the RSSI signal associated therewith will have the largest amplitude and will identify the tire sensor module at module #1 located at the right front tire at 158 of FIG. 5. For example, as illustrated in FIG. 6, a vehicle 200 is provided, wherein the vehicle control module 14 is closest to the right front tire 202, and the tire sensor module associated therewith is identified by the RSSI signal indicating the largest signal strength. At 158, not only is the first tire sensor module identified, but the vehicle control module may be configured to transmit thereto a predetermined time interval at that time, as may be desired.

Figure 7:
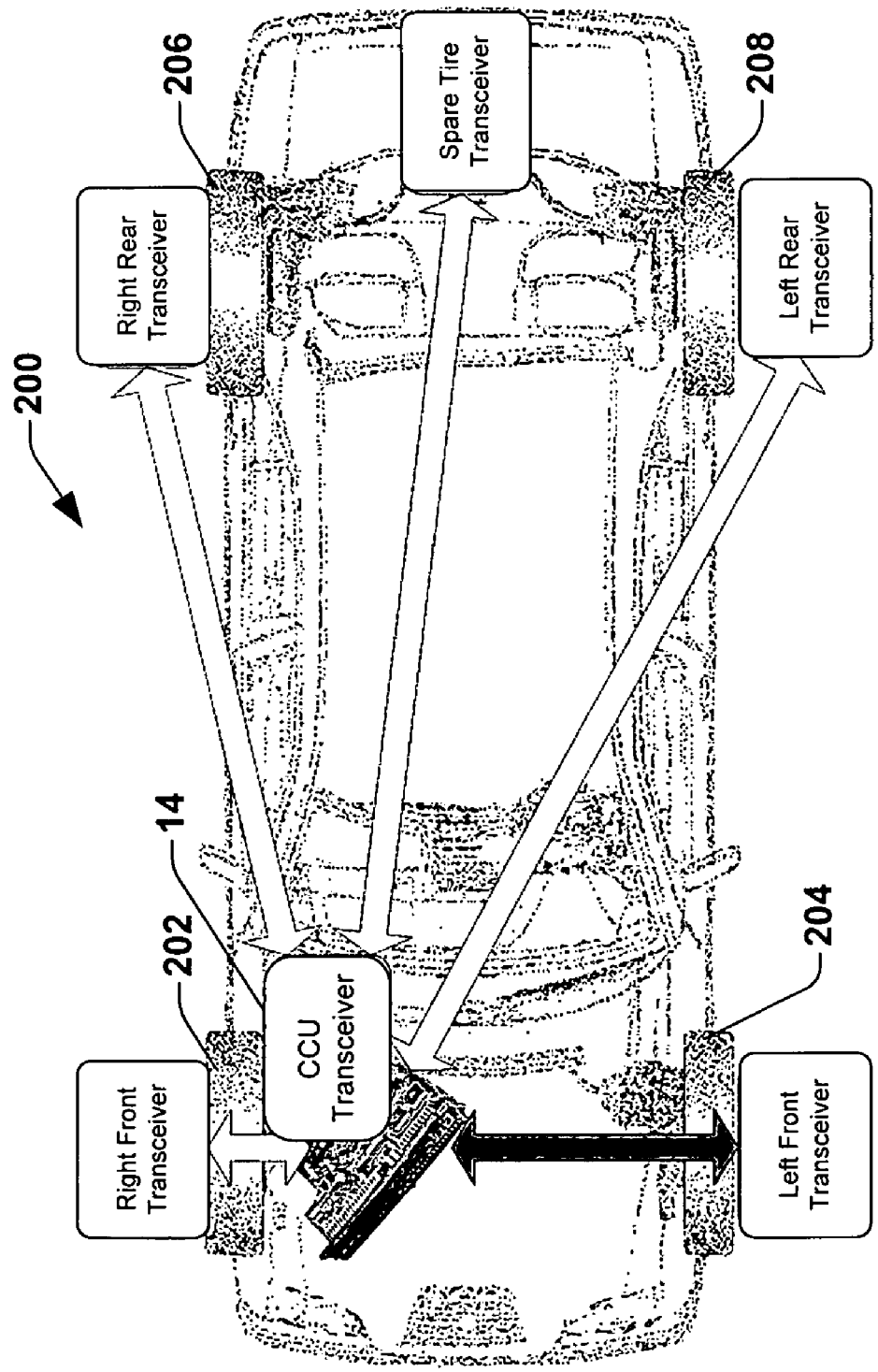
FIG. 7 is a plan view of a vehicle similar to FIG. 6, wherein a second tire sensor module location is identified using the received signal transmission strength.
Figure 8:
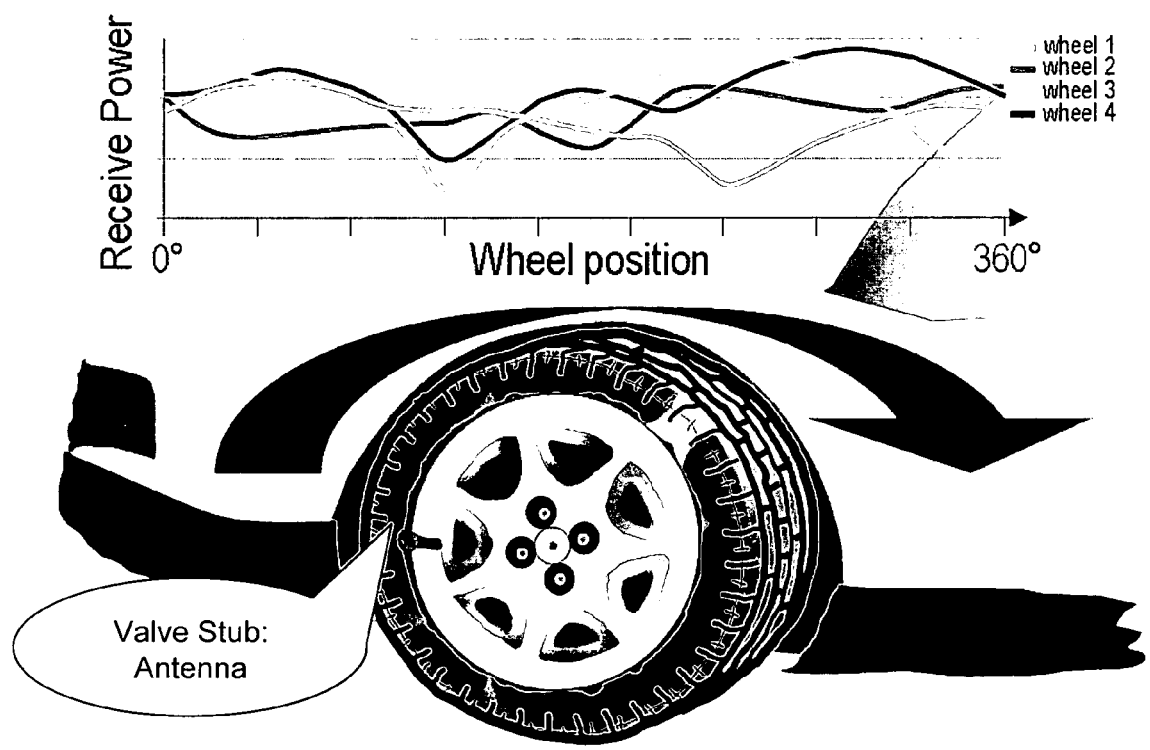
FIG. 8 is a combined graph and vehicle graphic illustrating how a periodic amplitude modulated signal may be employed to identify other tire sensor module locations according to another exemplary embodiment of the invention.
Figure 9:
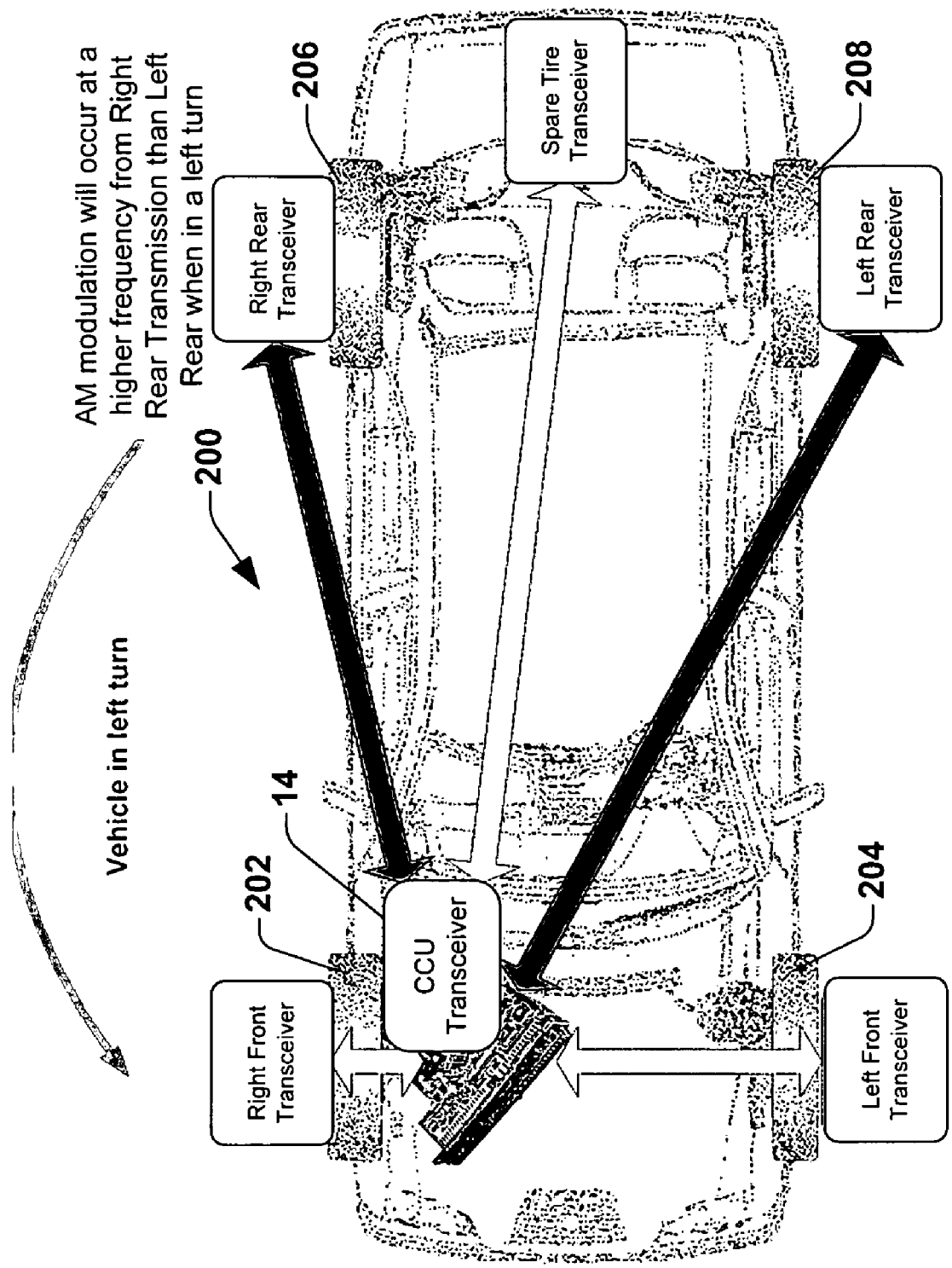
FIG. 9 is a plan view of a vehicle similar to FIGS. 6 and 7, wherein the vehicle is moving in a turn pattern, and illustrating how such a turn pattern may be employed in identifying the tire sensor module locations of remaining modules according to an alternative embodiment of the invention.

The method 150 continues at 160, wherein the vehicle control module 14 identifies the location of the next tire sensor module (module #2) by identifying the RSSI signal having the next greatest amplitude. In the above example, as illustrated in FIG. 7, the tire sensor module associated with the left front tire 204 is identified since it is substantially closer to the vehicle control module 14 than the remaining tire sensor modules. In one example, the already identified tire sensor module is deactivated so that the number of signals at the vehicle control module is reduced. At 160, the signal identification is noted and a unique predetermined time interval is transmitted thereto.

The above manner of identifying the tire sensor modules may be employed for all the tires in one example, wherein the RSSI signal is evaluated and the tire sensor module locations are determined based upon the strength of the signal transmission as a function of their distance from the vehicle control module. However, in some instances, since the transmitted signal decays relatively rapidly over distance, it may be difficult to have sufficient read margin between the remaining tire sensors to distinguish the differing locations with sufficient confidence. In such an instance, the method 150 of FIG. 5 contemplates moving the vehicle in a turn pattern to determine the location of the remaining tire sensor modules in one alternative embodiment of the invention.

At 162, the vehicle 200 is moving and placed in a turn pattern, for example, a left turn. As stated above, each of the remaining tire sensor modules that have not transitioned into the low power mode are periodically transmitting a unique identification signal that is being FSK modulated. With the vehicle in motion and in a turn pattern, the path loss associated with the transmitted signals to the vehicle control module 14 are attenuated as the wheels rotate through 360 degrees. This path loss is seen as a low frequency amplitude (AM) modulation that can be detected by sampling the RSSI signal at the vehicle control module. While in the turn pattern, the inner wheel (e.g., in a left turn the left rear wheel) will rotate at a lower speed than the outer wheel. Therefore by evaluating the RSSI signal, one can determine the remaining wheel locations. This characteristic may be more fully appreciated by evaluating the signals in FIG. 8.

Initially, at 164 of FIG. 5, the spare tire is easily identified because it is not turning, and therefore is not moving during the turn pattern. The tire sensor module associated with the spare tire is thus identified as the signal that is not experiencing any path loss in its transmission. The vehicle control module 14 then notes the identification signal associated therewith, notes the tire sensor module as module #5, and sends a unique predetermined time interval thereto for its transmission of tire data at a later time.

The remaining tire sensor modules (modules #3 and #4) are then identified at 166 based on evaluating the modulation effects during the turn, as discussed above. One exemplary way in which the vehicle control module may determine the turn direction is by having a technician use the turn signal during the process, and communicating that information to the vehicle control module 14 via the vehicle bus 40. As illustrated at 168 in FIG. 5 and in FIG. 9, when in a left turn pattern, the AM modulation will occur at a higher frequency from the tire sensor module associated with the right rear tire 206 than the tire sensor module associated with the left rear tire 208. Upon identifying the right rear tire sensor module, the vehicle control module notes the tire sensor identification signal as module #3, and transmits a unique predetermined time interval thereto. At 170, the last tire sensor module (module #4) is identified by default as the remaining tire sensor module, and the vehicle control module 14 notes the identification signal associated therewith, and transmits its unique predetermined time interval thereto.

As highlighted above, the present invention eliminates tire data collisions at the vehicle control module 14 by assigning unique predetermined time intervals to each of the tire sensor modules 12 during which such modules may acquire and transmit their data. Since each of the predetermined time intervals differ from one another and do not overlap in the time domain, the data collisions are avoided. Further, since each tire sensor module 12 now knows when it needs to operate, each module can enter a low power mode at times not associated with its respective predetermined time interval, thereby substantially reducing the battery draw for each module. Also, the present invention removes the need for an accelerometer at each tire sensor module. Since the vehicle control module obtains speed information (or other vehicle information) from the vehicle bus 40, the vehicle control monitor dictates the frequency at which each tire sensor module acquires and transmits its data. By eliminating the need for an accelerometer in each tire sensor module, the cost and complexity of such modules is reduced.

According to still another embodiment of the present invention, a networked sensor system is disclosed, wherein each of the sensor components wirelessly transmit data to a wireless control component, for example, for diagnostic or preventive maintenance purposes. The wireless control component is operable to assigned unique predetermined time intervals to each of the wireless sensor components. The wireless control components then transmit data to the wireless control component during their respective predetermined time intervals so as to eliminate data collisions with respect to such data at the control component.

For example, such a system may comprise a networked home or business, wherein a plurality of wireless sensors are operable to monitor various functions therein. For example, each of the wireless sensors are configured to monitor a given function and transmit an alarm if a given threshold is exceeded or a predetermined system condition is detected. For example, for a security sub-system, the wireless sensor components may comprise a motion detector or a security alarm associated with the state of a door or window. Further, the wireless sensor components may comprise smoke alarms or other safety or security devices that are wirelessly associated with a central wireless controller. Other networked items may include thermostats, appliances, lighting systems, entertainment systems, etc.

One or more of the various wireless sensor components may further be operable to perform an internal diagnostic or generate/acquire preventive maintenance or other type information about the given sensor component that is to be transmitted to the central control component. For example, such information may include remaining battery life, status indicator functions (lights, sounds, etc.), collected historical or trend data over time, etc. Instead of various sensor components transmitting such diagnostic or other data asynchronously where data collisions at the control component may occur, one or more (or each) of the wireless sensor components are assigned a unique predetermined time interval during which the respective sensor component transmits such data to the control component. Because each predetermined time interval is unique, data collisions at the control module with respect to such data is eliminated.

Each of the various sensor components also transmit alarm information or special status information to the central control module, and such data is not necessarily transmitted during a predetermined time period, but rather may be transmitted at any time, and preferably is transmitted immediately upon detection of an alarm condition.

In one embodiment of the present invention, a wireless time stamp system may be configured in a manner similar to that illustrated in FIG. 1, wherein instead of the sensor module being uniquely dedicated to a tire sensor, the sensor module may comprise any type of wireless sensor component that is operable to sense a given system condition. For example, if such sensor component is a smoke detector, the sensor portion associated therewith is configured to sense a smoke condition that exceeds a predetermined threshold. Further, the sensor component may collect other data associated therewith, for example, information relating to the remaining battery life of a battery (if applicable), or other type diagnostic information generated locally by a controller associated with the wireless sensor component (e.g., data relating to system integrity). In such an instance, it may be advantageous to periodically transmit such diagnostic information relating to the sensor to another component such as a wireless control component. By establishing unique predetermined time intervals for one or more sensor components in the system, the transceiver of each wireless sensor component does not need always be activated, but instead the sensor module can be in a low power or standby mode until the predetermined time interval, thereby reducing current draw in the battery.

Various wireless sensor components may also comprise an individual controller and transceiver to collect and transmit data therefrom in a wireless fashion. While the sensor components are configured to transmit diagnostic, configuration or other type information on a periodic basis, an alarm is another piece of data that, in some cases needs to be transmitted immediately. When an alarm condition (or other relatively urgent condition) is detected by the sensor component, the alarm data (accompanied by an identification signal to identify the sensor that sent the alarm) is transmitted by the transceiver associated with the component to the wireless control module. Because the time instance in which such alarm data is sent may coincide with a predetermined time interval of another wireless sensor component, the alarm data is sent a plurality of times, for example, in a periodic manner so as to ensure the alarm data is received in the event of a data collision. Further, in one alternative embodiment, the wireless control module, upon receipt of the alarm data, transmits back a confirmation signal to disable the wireless sensor component from continuing to transmit the alarm.

In such an instance, if the wireless control module detects that an alarm transmission interfered with other information within a predetermined time interval, the wireless control module may generate and assign updated, unique predetermined time intervals for that particular wireless sensor component and/or all the sensor components within the network in a network system re-initialization, as may be desired.

In the above exemplary system, the wireless control module may act like a master network component, while the wireless sensor components behave as slaves. However, the master/slave relationship is not to be interpreted in a limiting fashion, and is contemplated to cover other network configurations such as mesh networks, etc.

The wireless time stamp system may further be configured to operate in multiple modes. For example, upon a network first being configured (or upon any re-configuring or re-initialization thereof), the wireless control component may transmit a configuration mode signal globally (or individually during each predetermined time interval or general status update period) to all the wireless sensor components in the network. In response to such a signal, each of the wireless sensor components generates a unique identification signal associated therewith, and transmits such identification signal (e.g., identifying the sensor type, serial number, and location which may be manually configured at sensor installation) repeatedly with, for example, the time periods between successive transmissions being spaced in a random fashion. The wireless control module, upon distinctly identifying one of the wireless sensor components, transmits an identification confirmation signal and a unique predetermined time interval thereto for subsequent data transmission, after which the sensor component can go into a low power mode.

Alternatively, the wireless sensor component may learn the identity of the various sensor components at network installation by a technician assisted manual procedure, as may be desired. In addition, system re-configuration may be performed at predetermined re-configuration intervals, wherein each wireless sensor component awakens and looks for a re-configuration signal from the wireless control component. If no such signal is found, each of the components return to the low power mode.

In yet another embodiment of the invention, a method of transmitting data in a wireless fashion from a plurality of sensor components to a wireless control component is provided. The wireless control module assigns unique predetermined time intervals for transmission of certain forms of data thereto to each of the wireless sensor components. The wireless sensor components then wirelessly transmit the data to the control component during their respective predetermined time interval, thereby avoiding data collisions with respect to that data.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A wireless time stamp system, comprising:
   a plurality of slave wireless sensor components configured to transmit a sensed system condition at unique predetermined time intervals, wherein at least one of the plurality of slave wireless sensor components is further configured to transmit a periodic unique identification signal in a configuration or initialization mode of operation until an identification acknowledgement is received; and
   a master wireless control component configured to receive the transmitted sensed system conditions from each of the slave wireless sensor components, and further configured to assign the unique predetermined time intervals to the slave wireless sensor components, respectively, and further configured to transmit the identification acknowledgement to the respective slave wireless sensor component upon ascertainment of the unique identification signal.

2. The wireless time stamp system of claim 1, wherein the sensed system condition of at least two of the slave wireless sensor components are different from one another.

3. The wireless time stamp system of claim 1, wherein the unique predetermined time intervals are arranged with respect to one another in time such that data collisions associated with the transmitted sensed system conditions from the plurality of slave wireless sensor components do not occur at the master wireless control component at the same time.

4. The wireless time stamp system of claim 1, wherein the master wireless control component is further configured to generate updated unique predetermined time intervals and assign the updated unique predetermined time intervals to the plurality of slave wireless sensor components based on one or more system parameters.

5. The wireless time stamp system of claim 4, wherein the master wireless control component is further configured to assign the respective updated unique predetermined time intervals to each of the slave wireless sensor components upon receipt of the transmitted sensed system conditions from the respective slave wireless sensor components.

6. The wireless time stamp system of claim 1, wherein each slave wireless sensor component comprises:
 a battery;
 a system condition sensor coupled to the battery;
 a sensor controller coupled to the battery and the sensor;
 a transceiver coupled to the battery and the controller; and
 a clock circuit coupled to the battery and the controller,
  wherein in a standby mode the controller and transceiver are in a low power condition and the clock circuit is activated and operable to determine when the respective unique predetermined time interval is to be initiated.

7. The wireless time stamp system of claim 6, wherein during the respective unique predetermined time interval, the clock circuit of the respective slave wireless sensor component activates, directly or indirectly, the respective controller and transceiver, and wherein during the interval the respective transceiver transmits data associated with the sensed system condition in accordance with control instructions from the respective controller.

8. The wireless time stamp system of claim 7, wherein during the respective unique predetermined time interval, the respective sensor acquires the data associated with the sensed system condition or the data is acquired by a sensor diagnostic, a controller diagnostic, a transceiver diagnostic or a battery diagnostic.

9. The wireless time stamp system of claim 1, wherein the at least one slave wireless sensor component is configured to transmit the signal associated with the one or more conditions a plurality of times to ensure receipt thereof at the master wireless control component.

10. A multi-sensor network, comprising:
 a plurality of wireless means for sensing and transmitting a sensed system condition at unique predetermined time intervals; and
 a wireless control means for receiving the transmitted sensed system conditions, and assigning the unique predetermined time intervals to the plurality of sensing and transmitting means, respectively.

11. A multi-mode wireless time stamp system, comprising:
 a plurality of wireless sensor components, wherein at least one of the plurality of wireless sensor components is configured to transmit a periodic unique identification signal in a configuration or initialization mode of operation until an identification acknowledgement is received; and
 a wireless control component configured to receive the periodic identification signals in the configuration or initialization mode of operation, and further configured to identify each of the plurality of wireless sensor components based on the periodic, unique identification signals received thereat, and further configured to assign each of the plurality of slave wireless sensor components a unique predetermined time interval for subsequent transmission of information associated therewith, respectively, and further configured to transmit the identification acknowledgement to the respective wireless sensor component upon ascertainment of the unique identification signal.

12. The multi-mode wireless time stamp system of claim 11, wherein the plurality of wireless sensor components are further configured to enter a low power mode of operation upon receipt of the unique predetermined time interval from the wireless control component.

13. The multi-mode wireless time stamp system of claim 12, wherein in the low power mode at least one of the plurality of wireless sensor components has all components associated therewith deactivated except for a system condition sensor and clock circuit associated therewith.

14. The multi-mode wireless time stamp system of claim 13, wherein during the low power mode the system condition sensor is configured to detect one or more alarm conditions and upon such detection activate a controller and transceiver associated therewith for transmission of the detection of the one or more alarm conditions to the wireless control component.

15. The multi-mode wireless time stamp system of claim 14, wherein the transceiver is configured to periodically transmit the detection to the wireless control component until receipt of a confirmation signal therefrom.

16. The multi-mode wireless time stamp system of claim 15, wherein the wireless control component is further configured to generate updated unique predetermined time intervals for each of the plurality of wireless sensor components, and transmit the updated unique predetermined time intervals upon receiving a next sensed system condition from each of the plurality of wireless sensor components.

17. A method of transmitting data wirelessly from a plurality of wireless sensor components to a wireless control component, comprising:
 identifying an identity of one or more wireless sensor components, in response to the one or more wireless sensor components transmitting a periodic unique identification signal in a configuration or initialization mode of operation until an identification acknowledgment is received;
 assigning a predetermined time interval for transmission of the data to each of the identified wireless sensor components in accordance with the identity of each identified wireless sensor component, wherein each of the predetermined time intervals are unique; and
 wirelessly transmitting data from each wireless sensor component to the wireless control component during the respective predetermined time interval, thereby avoiding data collisions associated with the data at the wireless control component.

18. The method of claim 17, further comprising:
maintaining each wireless sensor component in a low power mode of operation at time periods not associated with the respective predetermined time intervals; and
activating data transmission components associated with the respective wireless sensor component during the respective predetermined time interval.

19. The method of claim 17, further comprising monitoring the respective predetermined time interval in each wireless sensor component via a clock circuit.

20. The method of claim 17, wherein identifying an identity of each wireless sensor component comprises:
for each wireless sensor component, transmitting a periodic, repeating unique identification signal to the wireless control component; and
confirming identification of each respective wireless sensor component by transmitting thereto from the wireless control component a receipt confirmation.

21. The method of claim 20, wherein the repeating portions of the periodic repeating unique identification signals of each wireless sensor component are spaced apart in time by a random amount.

22. A method of configuring a wireless sensor network comprising a plurality of wireless sensor components to a wireless control component, comprising:
maintaining each of a plurality of wireless sensor components in a low power condition in a standby mode of operation; and
activating the plurality of wireless sensor components in a configuration or initialization mode of operation by transmission of a wake-up command from a wireless control component.

23. The method of claim 22, wherein during the configuration or initialization mode of operation each of the wireless sensor components send unique periodic identification transmissions to the wireless control component.

24. The method of claim 23, further comprising:
identifying an identity of each of the wireless sensor components at the wireless control component based on the received unique periodic identification transmissions; and
assigning a unique predetermined time interval to each of the wireless sensor components during which data is transmitted from the respective wireless sensor component to the wireless control component.

25. The method of claim 24, further comprising maintaining a low power mode of operation in each of the wireless sensor components, wherein only a respective clock circuit and a respective sensor associated with the respective wireless sensor component is activated.

26. The method of claim 25, further comprising:
exiting the low power mode and entering a send mode when the clock circuit of each respective wireless sensor component identifies the respective predetermined time interval; and
transmitting sensor data from the respective wireless sensor component to the wireless control component during the predetermined time interval.

27. The method of claim 26, further comprising:
determining an updated predetermined time interval based upon one or more system characteristics; and
sending the updated predetermined time interval to the respective wireless sensor component after receipt of the sensor data therefrom.

* * * * *